United States Patent
Smith

(12) 
(10) Patent No.: US 9,181,924 B2
(45) Date of Patent: Nov. 10, 2015

(54) EXCHANGE OF MOMENTUM WIND TURBINE VANE

(76) Inventor: Alan J. Smith, Amherst, OH (US)

( * ) Notice: Subject to any disclaimer, the term of this patent is extended or adjusted under 35 U.S.C. 154(b) by 890 days.

(21) Appl. No.: 12/660,829

(22) Filed: Mar. 5, 2010

(65) Prior Publication Data

US 2011/0158804 A1 Jun. 30, 2011

Related U.S. Application Data

(60) Provisional application No. 61/284,816, filed on Dec. 24, 2009.

(51) Int. Cl.
- *F01D 5/18* (2006.01)
- *F03D 7/02* (2006.01)
- *F01D 5/00* (2006.01)
- *F03D 1/06* (2006.01)

(52) U.S. Cl.
CPC ............ *F03D 1/0675* (2013.01); *F03D 1/0633* (2013.01); *F03D 7/024* (2013.01); *F03D 7/0236* (2013.01); *F05B 2240/31* (2013.01); *F05B 2240/311* (2013.01); *F05B 2260/78* (2013.01); *Y02E 10/721* (2013.01); *Y02E 10/723* (2013.01)

(58) Field of Classification Search
CPC ..... F03D 1/0675; F03D 7/022; F03D 7/0228; F03D 7/0236; F03D 7/024; F03D 1/0633; F01D 7/00; F01D 7/02; F05B 2240/31; F05B 2240/311; F05B 2260/78
USPC ......... 416/1, 2, 9, 12, 17, 23, 24, 40, 41, 117, 416/142, 143, 197 R, 197 A; 415/1, 2.1, 4.1, 415/4.2, 4.4, 907; 290/44, 55
See application file for complete search history.

(56) References Cited

U.S. PATENT DOCUMENTS

| | | | | |
|---|---|---|---|---|
| 192,668 | A * | 7/1877 | Alexander | 416/23 |
| 665,891 | A * | 1/1901 | Fetty | 416/50 |
| 1,296,082 | A * | 3/1919 | Huber | 416/117 |
| 1,413,339 | A * | 4/1922 | Leimi | 416/118 |
| 1,915,689 | A * | 6/1933 | Moore | 416/117 |
| 3,995,170 | A * | 11/1976 | Graybill | 290/55 |
| 4,050,246 | A * | 9/1977 | Bourquardez | 60/398 |
| 4,142,832 | A * | 3/1979 | Clifton | 416/117 |
| 4,191,507 | A * | 3/1980 | DeBerg | 416/117 |
| 4,377,372 | A * | 3/1983 | Stutzman | 416/117 |
| 4,818,181 | A * | 4/1989 | Kodric | 416/196 A |
| 4,900,227 | A * | 2/1990 | Trouplin | 416/132 B |
| 5,570,997 | A * | 11/1996 | Pratt | 416/117 |
| 5,616,963 | A * | 4/1997 | Kikuchi | 290/55 |
| 6,582,196 | B1 * | 6/2003 | Andersen et al. | 416/202 |
| 6,682,302 | B2 * | 1/2004 | Noble | 416/1 |
| 6,893,223 | B2 * | 5/2005 | Roberts | 416/210 R |
| 2008/0075594 | A1 * | 3/2008 | Bailey et al. | 416/104 |
| 2008/0075599 | A1 * | 3/2008 | Miller | 416/182 |
| 2011/0084174 | A1 * | 4/2011 | Hemmelgarn et al. | 244/200 |

* cited by examiner

*Primary Examiner* — Ninh H Nguyen

(57) ABSTRACT

An exchange of momentum wind turbine vane having a large area for exchange of momentum which is made rigid with buckleable wing columns capable of automatic self-feathering the vane to protect it from damaging high-speed wind. The large vane area provides very low windspeed startup. In the preferred embodiment the vane is plastic and very inexpensive to manufacture. Four embodiments are described and shown.

2 Claims, 6 Drawing Sheets

EXCHANGE OF MOMENTUM WIND TURBINE VANE

CROSS-REFERENCE TO RELATED APPLICATIONS

This application claims the benefit of provisional application No. 61/284,816 filed Dec. 24, 2009 by the present inventor.

FEDERALLY SPONSORED RESEARCH

Not Applicable

SEQUENCE LISTING OR PROGRAM

Not Applicable

BACKGROUND OF THE INVENTION

This invention is an improvement in vanes for small wind turbines. It applies to small exchange of momentum wind turbine vanes.

Wind energy has been utilized by mankind since ancient times. It is believed that mechanical windmills in one form or another have been in use for thousands of years. Horizontal axis windmills have been in use over 700 years. Modern technology and innovation are making the gathering of wind energy much more efficient and wind energy devices more self-regulating.

Windmills can be classified by the orientation of the axis on which the blade or blades are mounted, specifically, horizontal axis and vertical axis wind turbines. One of the advantages of some vertical blade wind turbines is that they do not need to be oriented with respect to the direction of the wind because they are designed to utilize wind from all directions.

Modern, small, horizontal-axis wind turbines usually have a blade assembly upwind of the tower supporting the wind turbine and a tail assembly extending downwind of the tower. The tail assembly orients the wind turbine with respect to the wind. A typical small horizontal axis system has a generator, power train, and blade assembly mounted so that they can rotate as a unit about a vertical axis allowing them to track the wind. Larger, more sophisticated, and more expensive wind turbines have devices which can determine the direction of the wind and control mechanisms powered by electric motors which turn the entire unit to face into the wind.

There are some wind turbines, on the other hand, that have the blade assembly downwind of the tower upon which they are mounted. The oncoming wind produces a force on the blade system which tends to orient the blades to be perpendicular to the wind. The main drawback to such systems without the stabilizing effect of a tail assembly is the tendency of the entire wind turbine to make wide rotational excursions about its vertical axis due to the randomness of wind interacting with the turbine's blades. This is particularly disruptive for exchange of momentum machines since their vanes have much more surface area than those of wind turbines using Bernoulli's Principle.

There are two types of horizontal axis windmill blade systems: the aforementioned, now ubiquitous Bernoulli's Principle type and the exchange of momentum type. Exchange of momentum devices have been in use for thousands of years. Windmills operating on Bernoulli's Principle are relatively new. They have come to dominate in the marketplace despite the superiority—at least for small units—of windmills operating on the exchange of momentum principle.

Both types have their advantages. Bernoulli's Principle wind turbines are a better choice in the case of higher speed wind and in the case of very large wind turbines. Exchange of momentum systems are better suited to low-speed wind and lower power, less expensive, smaller generator systems.

Although exchange of momentum wind turbines have many advantages over Bernoulli's Principle turbines, there is one case in which Bernoulli's Principle turbines are clearly superior and the only reasonable choice, specifically, for turbines of very large size. In the case of large diameter turbines, the speed of the blades at their extremities is so great that energy cannot be transferred practically by the means of exchange of momentum, and the induced drag force is so large that the energy lost from drag forces greatly overwhelms any exchange of momentum blade system. Some Bernoulli's Principle wind turbines have blades in excess of 180 feet in length. At a leisurely pace of just 10 revolutions per minute, the speed of the tips of blades of such length will exceed 125 miles per hour. At such speeds, the vane of an exchange of momentum system would be retreating from the oncoming wind at such a high speed that an extremely high velocity wind would be necessary just to keep up with the retreating vane surface—much less transfer momentum to the vane. Additionally, if the vanes of an exchange of momentum system could reach such speeds, drag forces would greatly overwhelm an exchange of momentum system.

The blades of wind turbines operating on Bernoulli's Principle have a profile that is similar to that of the wings of an aircraft. Their driving force is the same force that causes an airplane wing to produce lift. The faster the wind blows, the greater the "lift" force exerted on the blade. This greater force moves the blade faster and produces more power. However, the faster the blade moves, the greater the drag force acting on the blade which tends to slow it down, decrease its efficiency, and reduce the power it can produce.

The speed at which the end or tip of a vane moves depends upon the rate of rotation of the vane and its length. For any given speed of rotation, the tip of the vane moves the fastest and each incremental portion of the vane towards the hub moves slower. The speed at which the vane tip of a smaller wind turbine vane advances is not great even for a relatively fast turning vane. Consider and compare a small vane turning twice as fast as the large blade in the example given above. A vane having a length of 10 feet turning at 20 revolutions per minute (twice as fast as the example above) has a vane tip which is moving at only slightly over 14 miles per hour. If the vane angle is 30 degrees, the vane surface at the end of the vane is moving at only about 7 miles per hour in the direction of the axis of rotation. If the wind is also moving at 7 miles per hour, the wind is exerting no force on the vane in the direction of its axis of rotation. Hence, any wind that is moving at a speed in excess of 7 miles per hour would contribute power.

The vane systems of exchange of momentum turbines typically have a very large surface area compared to Bernoulli's Principle blades. The greater the area of the vane, the greater is the potential exchange of momentum and, therefore, power. However, concomitant with that larger vane surface area is the possibility of extreme forces acting on the vane system when it is subjected to very high-speed winds.

One of the great problems with wind turbines and particularly exchange of momentum wind turbines is the potential significant damage high-speed wind can inflict upon the device. This is particularly true with exchange of momentum wind turbines with their vanes having a very large surface area exposed to high-speed wind. The forces produced by high-speed winds impacting the relatively large surface area of exchange of momentum turbine vanes can become extremely destructive.

Many means have been developed to protect wind turbine blades from the extremely destructive forces of high-speed winds. One method illustrated in U.S. Pat. No. 1,936,233 (Groves, 1933) has a wind-driven rotor behind a series of vertically mounted shutters which can be closed in front of the turbine. Closing the shutters blocks the wind from reaching the turbine. This system has significant drawbacks, however, such as requiring a very high-strength tower and massive tower foundation to resist the extremely high wind forces the system would experience in a strong storm. These forces would be particularly large if the shutters were closed thereby not allowing wind to pass through. In addition, the many slats in the shutter system would be susceptible to icing and could fail to operate in cold and icy weather.

U.S. Pat. No. 4,177,012 (Charles, 1979) reveals another way turbine blades could be protected from high-speed wind. This patent discloses a fan blade for an automobile having a series of bends which would decamber with increasing fan speed. Such a device could be adapted for use as a wind turbine. However, such an arrangement would have at least one very significant disadvantage in a wind turbine. Because winds are uneven and constantly varying in speed and force, wind turbine blades constructed in this fashion would be continually cambering and decambering. The constant changes in shape and mass distribution while rotating could cause large, unpredictable forces in the relatively large wind turbine blade system and supporting tower which could lead to its destruction, or, at the very least, require significant design effort in an attempt to anticipate and design for such forces. U.S. Pat. No. 3,758,231 (Barnstead, 1973) is similar in having the deflection of the blade more or less proportional to the force applied to it and, therefore, suffering from the same disadvantages of possible cycling of shape and mass distribution if it were to serve as a wind turbine blade.

Another way to counteract the destructive forces of high-speed winds which has been designed for wind turbines incorporates mechanisms to "feather" the vanes or sails as they are sometimes called. U.S. Pat. No. 1,334,485 (Clipfell and Manikowske, 1920) is illustrative. The wind turbine in this case features a multiplicity of vanes radially disposed about a central hub. The wind turbine is designed to allow the vanes to rotate about their own longitudinal axes under the influence of a plurality of governor weights which react to the speed of the rotor. Thus, the vane could be oriented along the flow of air for minimal interaction with the wind when the wind speed is high or the vanes could be turned so the flow of air would make contact with the vane's surface to cause exchange of momentum when the wind speed is less. Unfortunately, the large number of vanes with accompanying hinges, pins, and connecting arms would be susceptible to corrosion and, most significant, freezing in winter. Such an eventuality could cause the unit to be destroyed in high winds. Likewise, U.S. Pat. No. 2,633,921 (Monney, 1953) incorporates a flexible canvas-like vane secured by cables and tensioning springs to a number of "shafts" extending radially from a hub. This device, too, suffers from its susceptiblity to malfunction caused by extreme weather and ice.

U.S. Pat. No. 4,632,637 (Traudt, 1986) discloses a mechanism which allows the blades of a downwind turbine to both feather and pivot downwind so that, instead of extending radially in possibly damaging high winds, the blades pivot back so they extend downwind and out of the flow of the wind. This would be, if it were built, a complex and expensive device which would also be susceptible to icing and would be unable to produce any power after the blades had pivoted.

In addition to the applicable aforementioned impairments, Bernoulli systems require higher windspeeds to start their relatively narrow blades systems in rotation from rest than do exchange of momentum systems. Their slender and expensive blades are only able to accept a small percentage of the kinetic energy of the air that passes through their swept area—a percentage far less than the theoretical Betz Limit—thereby diminishing their potential power output. Furthermore, Bernoulli Principle blades must have carefully designed and precisely manufactured blades in order to implement the Bernoulli Principle. Such precision makes them much more expensive to manufacture than exchange of momentum vanes.

Indeed, Bernoulli Principle blades are very expensive to use in wind turbine applications. While Bernoulli Principle wind turbines would extract more power if they were equipped with three, four, or even five blades than they would with just two blades, the very high cost of the blades makes it too expensive to produce Bernoulli Principle wind turbines with more than three blades since each additional blade costs as much as the previous blade but adds less power because of increased parasitic drag. Vanes constructed in accordance with the invention disclosed herein need merely be a relatively flat surface. They need not have special characteristics beyond being substantially impermeable to air.

SUMMARY OF THE INVENTION

The wind turbine vane invention disclosed herein is simple, effective, and cheap. It needs very few parts. It can function in an upwind or downwind rotor. It can function in any kind of weather and is not affected by ice nor snow. It is light-weight and very inexpensive to manufacture. It can be constructed of almost any material.

Like other inventions designed to protect a wind turbine from the destructive power of high-speed wind by decreasing the amount of surface area exposed to oncoming wind, the present invention has the same goal. However, instead of using a mechanism to accomplish the task, it uses its shape interacting with the wind to reconfigure the vane to a form which can withstand very high speed wind. And, instead of producing a response proportional to the force produced by the wind thereby allowing possible destructive harmonic oscillation, it responds to wind speed as though controlled by a step function to configure itself to withstand high-speed wind.

PREFERRED EMBODIMENT

A wind turbine using the invention described herein would preferably have four vanes, but it is possible and, depending upon circumstances, may be desirable to have one, two, three, five, or more vanes. Regardless of the number of vanes, it is important, of course, that the vane system (including the hub and all the components attached to it) be dynamically balanced. A wind turbine utilizing the present invention would preferably have all vanes substantially identical and symmetrically peripherally spaced around a hub although other arrangements could be used.

Figure 1:
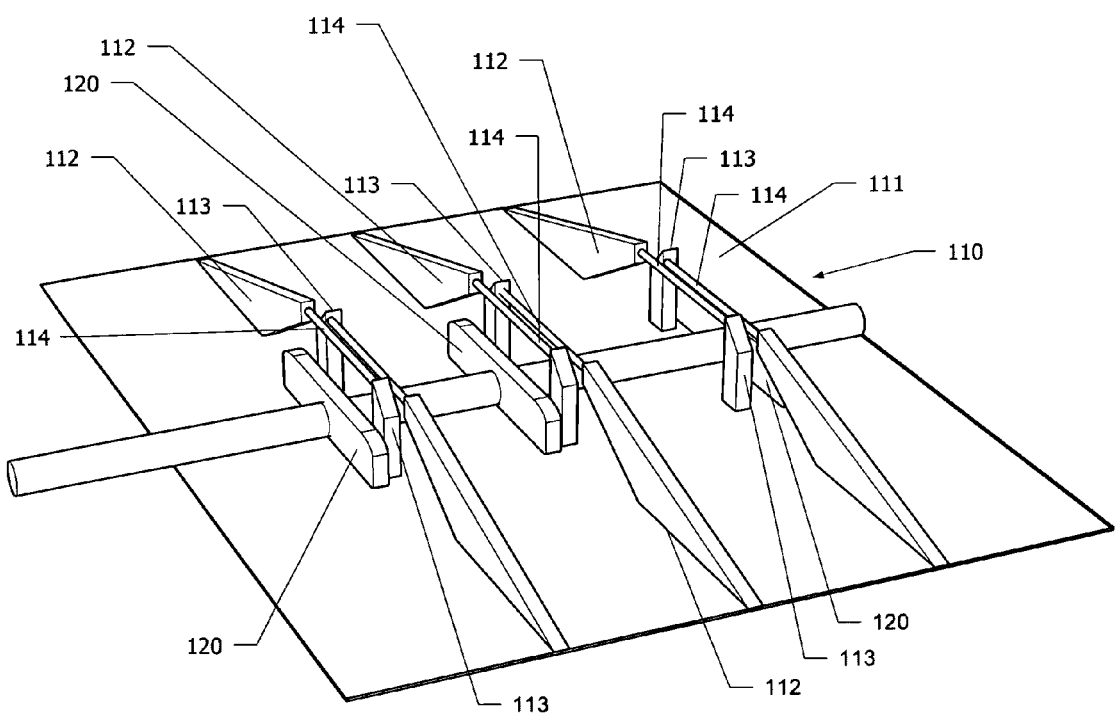
FIG. 1 is a perspective view from the back of a wind turbine vane constructed in accordance with the first preferred embodiment of the invention.

The embodiment of FIG. 1 shows the back of vane 110. Vane 110 is attached to vane spar 130 using vane attachment brackets 120. One of the advantages of the invention is that it creates a vane system of basic components that minimizes material and labor required to repair the vane system should a component fail or be damaged while in service.

The method of attachment of components is not significant. Attachment accomplished by adhesives, metal or plastic screws, and interlocking matching surfaces are among the possible methods of attachment. It is also possible to form several or all components as one piece such as through molding or casting.

In regard to the preferred material of which vanes 110 are made, it is clear that the overwhelmingly superior material is plastic. Plastic is a material well-suited to this purpose, possessing properties that ideally match with the application although it is within the scope of the invention for the vanes to be made of steel, aluminum, wood, or other materials. Plastic components can have the advantages of strength, resistance to corrosion, electrical non-conductivity, durability, resilience, tolerance of extreme heat and cold, lightweight, ability to flex to large angles without exceeding their proportional limit, and resistance to ice buildup.

Obviously, all of the vanes should be angularly displaced in the same direction from the plane of rotation so that all the vanes contribute energy to the device being powered by the turbine. Experience has shown that an angular displacement of 30 degrees from the plane of rotation is a good starting place although the optimum angle depends upon numerous factors. Vanes 110 can rotate in either direction. Their direction of rotation depends upon which direction they are angularly displaced from the plane of rotation.

The vane assembly shown in FIG. 1 has three main components: the air impact surface 111, vane attachment brackets 120, and vane spars 130. Vane attachment brackets 120 are rigidly connected to the vane spar 130. The largest component of vane 110 is the air impact surface 111, also referred to as the flexible exchange of momentum surface. Air impact surface 111 is the broad area of vane 110 which interacts with the wind. Exchange of momentum vanes are much more tolerant of surface imperfections than Bernoulli's Principle blades, but the smoother and more aerodynamic the design and construction of exchange of momentum vanes, the better they perform.

Extending from the back of air impact surface 111 are the air impact surface columns 112. Air impact surface columns 112 strengthen vanes 110 and increase the stiffness of air impact surface 111. The increased stiffness provided to air impact surface 111 by air impact surface columns 112 allow vanes 110 to substantially rigidly interact with impinging wind. Also, on the back of air impact surface 111 is the vane column base 113. The distance between air impact surface column 112 and vane column base 113 is spanned by the vane column 114.

The dimensions of vane column 114 will depend upon the desired performance of the wind turbine. If a wind turbine's design requires reduction of the vane surface exposed to the wind at some significantly large wind speed or wind pressure on vane 110, the vane column's design will allow the vane profile to change to provide the performance desired.

In 1757, mathematician Leonhard Euler developed a formula with which one can calculate the maximum axial load that a long, slender, column can support without buckling. The maximum axial load is called the critical load. Any increase in load above the critical load will cause the column to collapse by a process known as buckling. Buckling is a failure of instability, not of weakness. This is significant because a column that buckles can experience total failure as a column without a failure of the column's material nor post-buckle load carrying capacity. Columns made of some materials such as plastic can buckle and completely collapse yet not suffer permanently structural damage because the plastic will not have reached its ultimate strength nor its yield point in the buckling process. It is a characteristic of thin rods and thin sheets that they can be significantly deformed but, nonetheless, not be stressed to their yield point. Thus, when not subjected to deformation by buckling, they can return to their original shape and load-carrying capacity.

The formula which yields this maximum sustainable force is $\pi^2(EI)/(KL)^2$, where E is the modulus of elasticity of the material comprising the column; I is the second moment of area of the cross-section of the column perpendicular to its axis; k is the effective length factor of the column which depends upon the conditions of end support of the column; and L is the length of the column. Examples of the constant k are ½ for a column where the ends are rigidly fixed and 1 for a column whose ends are pinned.

Considering separately the elements of Euler's column formula that are variables and those that are constants, one can see that the formula has three factors that are constants or properties of the column's material, specifically, $\pi$, E, and k, and two factors that are determined by the shape of the column, specifically, I and L. I, the second moment of area, is determined by the shape of the cross-section of the column. The second moment of area of an object is a measure of the object's resistance to deflection or bending.

When a column is subjected to bending perpendicular to the column's axis, part of the column will be in compression and part will be in tension. Separating these two parts is a plane which will be in neither compression nor tension called the neutral plane or sometime called the neutral axis.

The second moment of area used in the Euler column formula is calculated by evaluating the expression $\int x^2 da$ as applied to a cross-section of the column taken perpendicular to its axis. Approximately stated, this expression is evaluated by taking a small area of the cross-section of the column under consideration and multiplying this area by the square of its distance from the neutral axis and summing all of these products for the entire cross-section. Since each area is multiplied by the square of its distance from the neutral axis, the areas distant from the neutral axis have an overwhelming significance over those close to the neutral axis. This principle explains why a wooden plank cantilevered by its broad side is springy, but cantilevered by its narrow side is very stiff.

It is interesting and significant to note that the compressive strength of the column's material has nothing to do with the column's resistance to collapse by buckling. Also worth noting is that the magnitude of the force that will collapse a column depends upon how the column's ends are attached such as hinged, pinned, or unrestrained. No matter how a column is attached, the buckling strength of a column varies with the inverse of the square of the column's length. Doubling the length of the column will decrease the load it can support against buckling to one-fourth of its original load-carrying capability. Small changes in a column's length can produce much larger changes in a column's resistance to buckling.

Returning to consideration of wind turbines, in operation, the wind coming in contact with air impact surface 111 will produce a force on the entire air impact surface 111 through exchange of momentum. This force will cause air impact surface 111 to tend to wrap around the curved portion of vane attachment bracket 120. However, air impact surface 111 is held in place by vane column 114. As the wind speed increases, the force exerted by the moving air on air impact surface 111 will increase with the square of the windspeed. When the windspeed reaches the maximum design speed, the force acting on air impact surface 111 will be at its maximum design specification and will produce in vane column 114 a force that will cause vane column 114 to buckle. When vane columns 114 buckle, air impact surfaces 111 will be released and will be forced back against the curved portion of vane attaching bracket 120. The restoring force of the buckled vane column 114 is very weak and the buckled vane column 114 will remain buckled until the windspeed decreases significantly.

The portion of air impact surface 111 that does not move with the buckling of blade column 114, specifically, the width of air impact surface 111 under vane attachment brackets 120, obviously, has a minimum size after air impact surface 111 has buckled. The length of vane column 114 must be of sufficient extent to allow for a column having buckling characteristics that will provide proper function of vane 110, and, hence, vane attachment brackets 120 cannot be reduced in length without limit. It may be desirable in some circumstances, however, to reduce the span of vane attachment brackets 120 by more than is possible with this embodiment in order to reduce the force acting upon vane 110 after buckling in very high-speed wind, for example. In such cases, the embodiment shown in FIG. 2 may be desirable.

Figure 2:
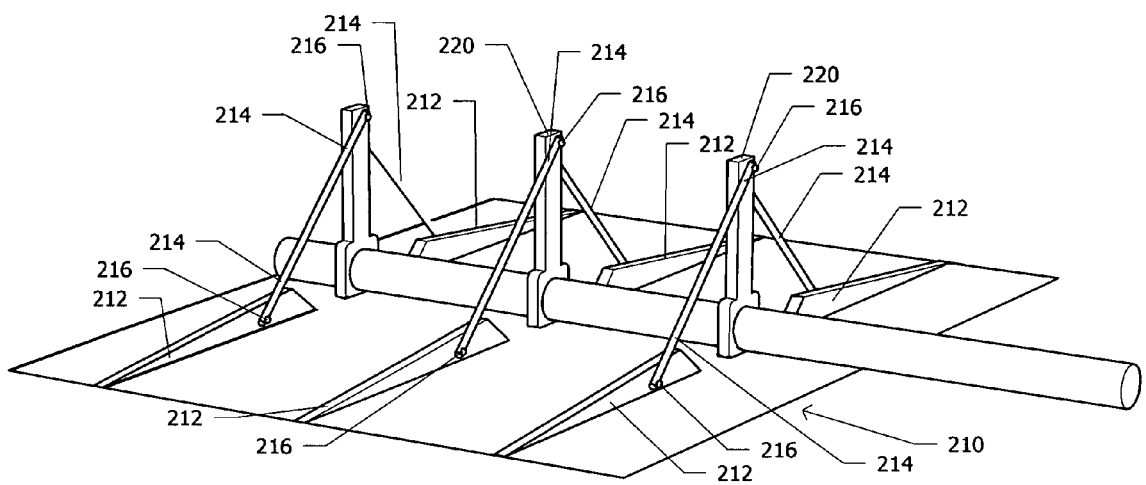
FIG. 2 is a perspective view from the back of a wind turbine vane constructed in accordance with the second preferred embodiment of the invention.

FIG. 2 shows a perspective view of the vane 210 of this second embodiment. This embodiment has an air impact surface 211 similar to the first embodiment. It, too, has a plurality of vane attachments brackets 220. In this embodiment, vane attachment brackets 220 have a much shorter span across air impact surface 211. Strength and rigidity are imparted to air impact surface 211 by the plurality of vane surface ribs 212 on air impact surface 211.

In order to have the force produced by air impact surface 211 acting collinearly with the axes of vane columns 214, the ends of vane columns 214 are pinned instead of fixed. In this case, the value of k in Euler's column equation will change to 1 from ½. One end of vane column 214 is pinned to an air impact surface rib 212 with a pin 216. The other end of vane column 214 is pinned to vane attachment bracket 220 with second pin 216. All vane columns 214 are pinned in the same manner. Vane columns 214 keep air impact surface 211 essentially planar.

In this embodiment, the vanes operate in the same fashion as the previous embodiment with a few important differences. When vane columns 214 buckle, air impact surface 211 will bend around vane attachment brackets 220 and can leave a very small area exposed to the wind instead of the much larger area required by the first embodiment although the size of the area can be set at any size desired by choosing an appropriate shape for vane attachment bracket 220. The previous embodiment had a minimum vane surface after buckling of its vane column which could not be reduced any further. In this second embodiment with a much smaller minimum vane area, the vane assembly can be designed to effectively stop rotating after it has buckled, if that is desired, by making vane attachment brackets 220 approximately the width of spar 230.

Because the portion of air impact surface 211 exposed to the wind after buckling can be is extremely small, the forces acting on vane spar 230 will be very small which will allow the wind turbine vanes to survive very high-speed wind. However, it can be seen that, through choice of the shape of vane attachment bracket 220, the size of air impact surface 211 exposed to oncoming wind after vane columns 214 have buckled can have almost any size desired.

Figure 3:
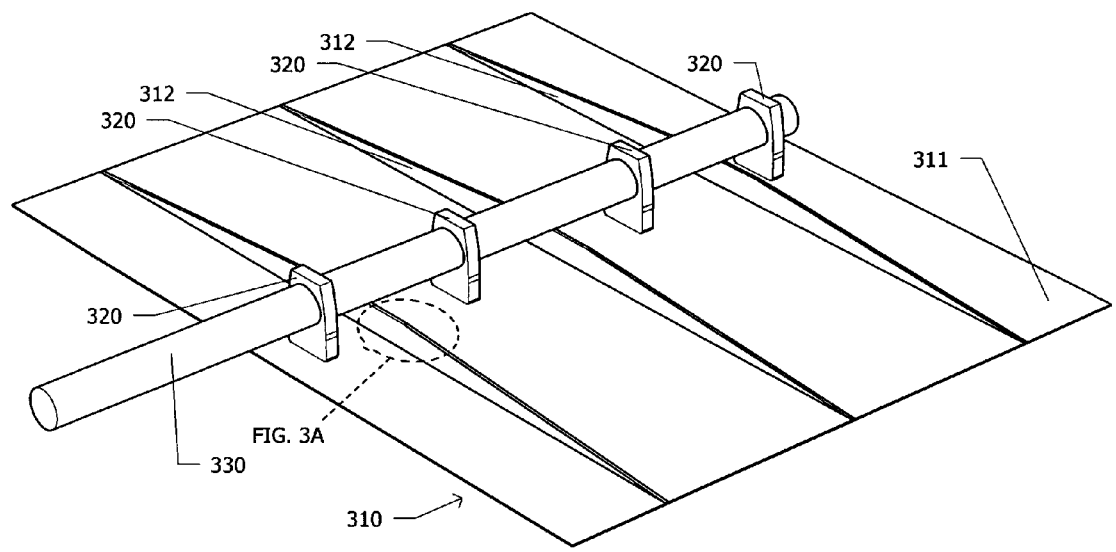
FIG. 3 is a perspective view from the back of the third preferred embodiment of the wind turbine vane constructed in accordance with the invention.

A third preferred embodiment is shown in FIG. 3. This preferred embodiment has a vane spare 330 similar to the other embodiments. Attached to spar 330 are a plurality vane attachment brackets 320. Among the various functions of vane attachment brackets 320 is holding the air impact surface 311 in position. Air impact surface 311 is similar to the air impact surface of the other embodiments. The back of air impact surface 311 has one or more air impact surface columns 312. Air impact surface columns 312 can be formed with and can be an integral part of air impact surface 311.

In this third embodiment, air impact surface columns 312 have dual roles: they serve as stiffening columns for air impact surface 311, and they serve the same purpose as the vane columns in the previous embodiments, specifically, to hold the air impact surface 311 in position until a predetermined wind speed causes air impact surface columns 312 to buckle and allow air impact surface 311 to bend around vane attachment brackets 320. The operation of this embodiment is analogous to the previous two embodiments.

Figure 3A:
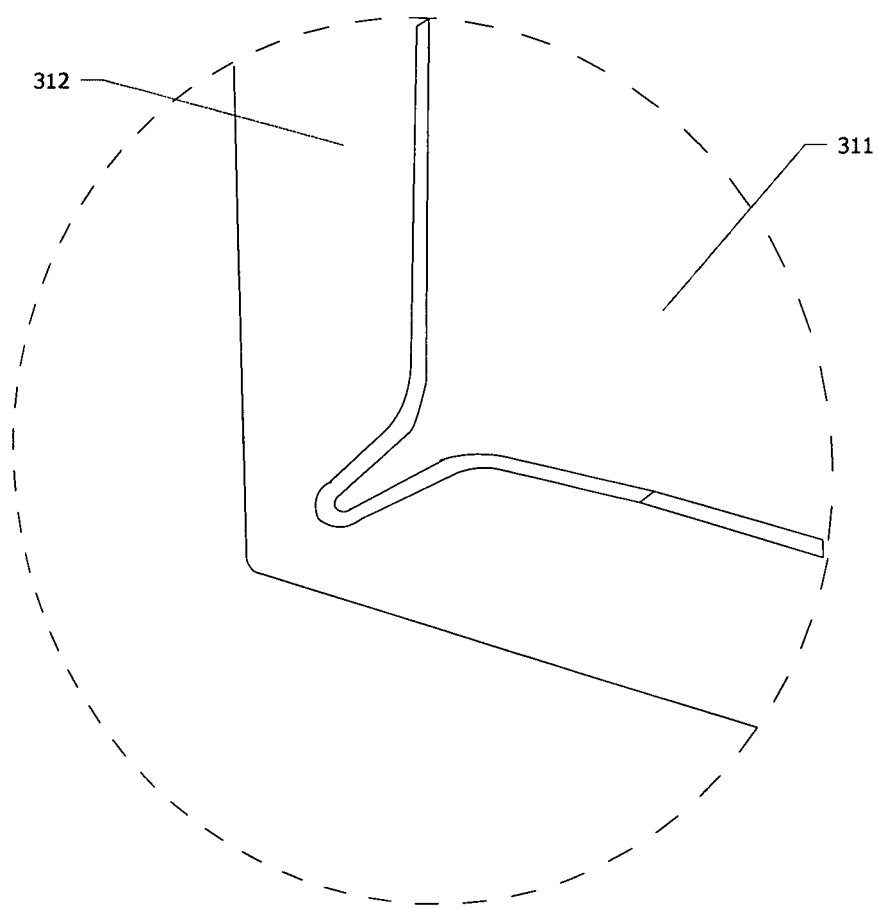
FIG. 3A is an enlarged detail view of the surface column of FIG. 3 after it has buckled.

As the force of the wind upon air impact surface 311 increases, the outer portion of air impact surface columns 312 will be subjected to compressive forces. These forces will have their greatest magnitude at the furthest extremity of air impact surface column 312 from air impact surface 311. The compressive force will increase with an increase of the speed of the impinging wind. If the compressive force becomes large enough, air impact surface columns 312 will buckle in a manner shown in FIG. 3A. Upon the buckling of air impact surface columns 312, air impact surface 311 will bend out of the flow of air and around vane attachment bracket 320. In this embodiment, the portion of air impact surface 311 that remains exposed to the oncoming wind after air impact surface columns 312 have buckled can be made almost as large or as small as desired.

Figure 4:
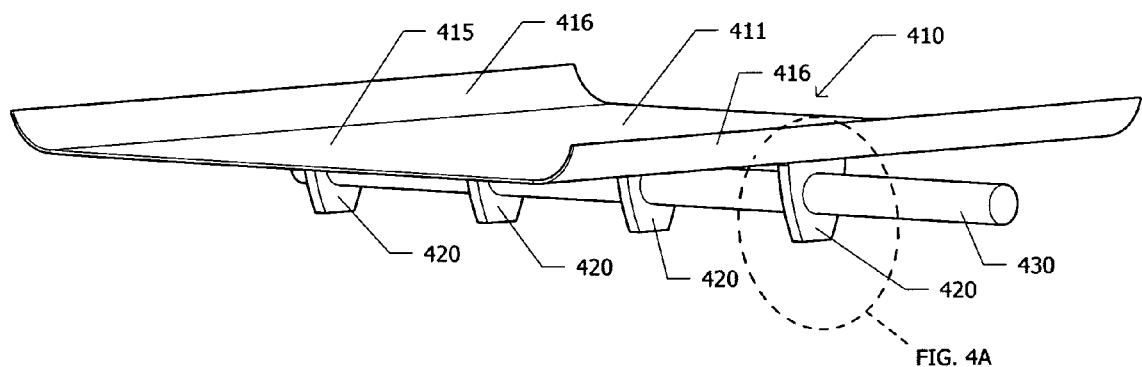
FIG. 4 is a perspective view from the back of the fourth preferred embodiment of the wind turbine vane constructed in accordance with the invention.

The fourth embodiment shown in FIG. 4 has no air impact surface columns. The blade 410 uses its shape to obtain its stiffness and ability to buckle. In this embodiment the air impact surface 411 can have almost any shape.

In this embodiment the air impact surface must meet two criteria: First, it must be of such a shape that it is substantially longitudinally rigid perpendicular to the spar upon which it is mounted. Second, it must be shaped so that the force of the wind pushing against it can deform the air impact surface in a manner such that the second moment of area of the air impact surface with regard to an axis parallel to the spar can be decreased by the force of the wind to such an extent that it will buckle at a predetermined wind speed.

A preferred way to fulfill the second requirement is to construct the air impact surface so that there are longitudinal regions perpendicular to the spar which extend out from the base plane of the air impact surface. These longitudinal regions maintain the air impact surface in its desired shape to interact with the wind. If the wind speed were to increase to a point where damage might be done, the wind would push down and flatten these regions toward the base plane which would reduce the second moment of area of the air impact surface and lessen the air impact surface's resistance to bending and allow buckling if the predetermined speed is exceeded.

In this embodiment, vane 410 has three main components, specifically: the spar 430, the vane attachment brackets 420, and the air impact surface 411. Air impact surface 411 is fixedly mounted on spar 430. Air impact surface 411 has a substantially flat base 415 with flexible wing columns 416 extending from each side. It can be seen that flexible wing columns 416 extend a substantial distance above base 415 and the neutral axis of air impact surface 411. Air impact surface 411 in this embodiment derives its longitudinal stiffness perpendicular to spar 430 from its geometry. Flexible wing columns 416 extending from base 415 perpendicular to spar 430 extend a significant distance above the plane of air impact surface 411. These longitudinal extensions increase the second moment of area of air impact surface 411 thereby imparting significant rigidity to air impact surface 411. The increase in the second moment of area can also be created by producing an air impact surface having a twist instead of a planar surface thereby producing functional buckling ability. It may be advantageous to combine wing columns with a twist in the air impact surface.

In this embodiment, flexible wing columns 416 are a contiguous, unitary region with base 415 that, together, form air impact surface 411. Flexible wing columns 416 give strength and stiffness to the entire air impact surface 411 perpendicular to spar 430 due to the portion of flexible wing columns 416 that extend beyond air impact surface base 415 and the neutral axis of air impact surface 411. The thickness of flexible wing column 416 and extension beyond the neutral axis of air impact surface 411 give vane 410 its functional buckling ability. If air impact surface 411 were large and needed further stiffening against buckling or additional strength, it could have "U"-shaped protrusions or humps extending across its width parallel to flexible wings 416 in a fashion similar to flexible wings 416.

Figure 4A:
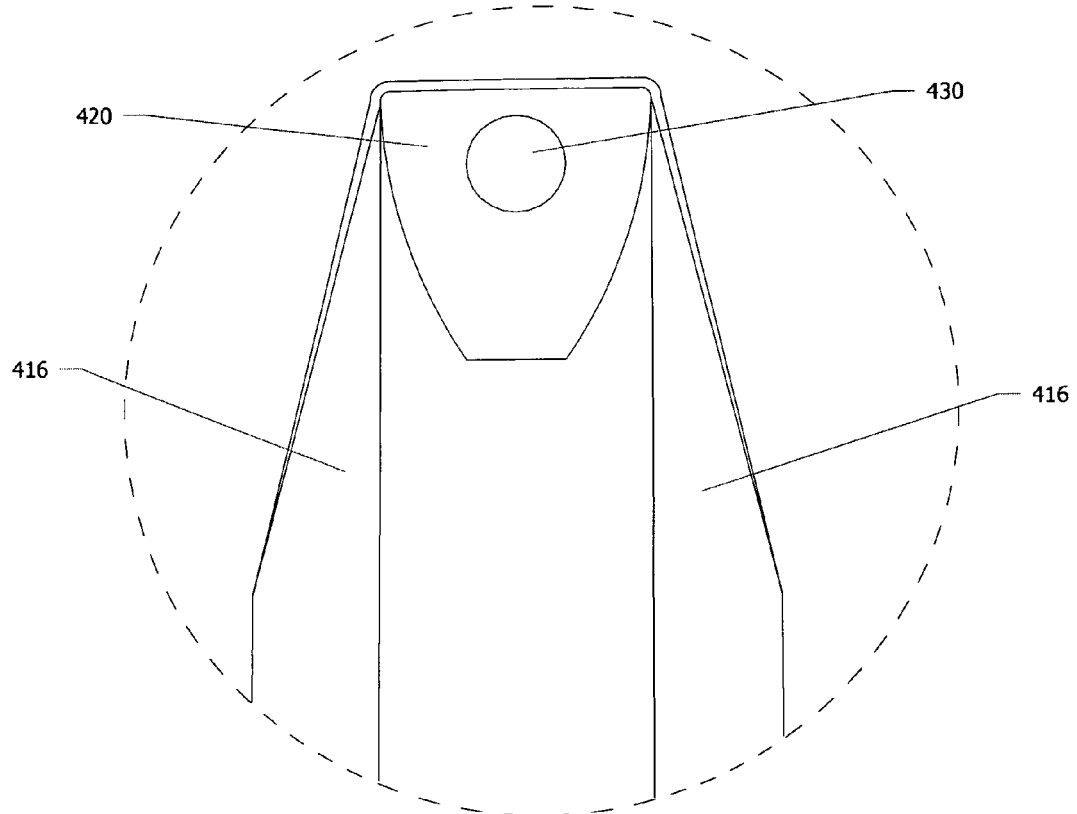
FIG. 4A is an enlarged detail view of the wind turbine vane of the fourth preferred embodiment after it has buckled.

In operation, wind impinging upon air impact surface 411 will exert a force on all of air impact surface 411. As the wind speed increases, the force acting on air impact surface 411 will increase. As the force against air impact surface 411 increases, flexible wing columns 416, not having any support under them from vane attachment brackets 420, will be forced toward the plane defined by vane attachment brackets 420 thereby tending to bend down flexible wing columns 416 toward the plane of vane base 415. The flattening of air impact surface 411 will reduce its second moment of area or its resistance to bending of air impact surface 411 as the entire surface becomes flatter. If the wind speed continues to increase and the force acting on vane 410 increases, eventually air impact surface 411 will flatten to an extent that its resistance to bending will have decreased enough to allow the wind to overcome its resistance to bending, and air impact surface 411 will buckle. When air impact surface 411 buckles, flexible wing columns 416 will become co-planar with the air impact surface base 415 as shown in FIG. 4A, and air impact surface 411 will bend around blade attachment brackets 420.

In this buckled configuration, air impact surface 411 will be essentially flat along the region where it has buckled. The second moment of area, will have its minimum value, and the force tending to restore air impact surface 411 to its original shape will be very small and will be much smaller than the force required to buckle air impact surface 411. Flexible wing columns 416 will be in the plane of the air impact surface base 415 only in the region of buckling. Areas more distant from the buckled portion of air impact surface 411 will experience less deformation which can be seen in FIG. 4A where the lower portion of air impact surface 411 remains in its unbuckled shape, but the top portion lies flat and parallel to the vane attachment brackets 420. Portions of flexible wing columns 416 distant from the buckled portion of air impact surface 411 maintain the original shape.

The details of the vane and column will depend upon specific circumstances. Chief among the considerations are the size of the vane, thickness of the vane, modulus of elasticity of the column, the number of columns, the second moment of area of the columns, the length of vane attachment brackets, desired turbine speed, desired turbine power, and the desired windspeed for column buckling. It may be desirable to have multiple smaller vanes placed along the length of the spar rather than one large vane. This invention can be used not only to extract energy from moving fluid but can also be used to impart energy to fluids.

Vanes constructed in accordance with the invention disclosed herein have significant advantages over prior technology. It provides a way to construct practical, large-area, lightweight, inexpensive exchange of momentum vanes that can automatically protect themselves from otherwise damaging high-speed wind. It has many advantages over prior art, including:

1. Enabling the manufacture of extremely inexpensive wind turbine vanes that are rugged and substantially insensitive to manufacturing imperfections and environmental damage;

2. Enabling the manufacture of exchange of momentum vanes of nearly any desired dimensions that can automatically feather themselves in high winds which would otherwise destroy the vanes and automatically un-feather themselves after the winds have calmed;

3. Enabling the manufacture of large area wind turbine vanes which can be started by very low-speed wind—at much lower speeds than Bernoulli Principle blades;

4. Enabling the manufacture of light-weight wind turbine vanes which can be made as colorful or bland in appearance as desired while not constituting a danger to wildlife.

The above described embodiments are given as illustrative examples. Many other deviations can be made from the specific embodiments disclosed in this specification without departing from the invention. The scope of the invention is to be determined by the claims below rather than limited to the embodiments described herein.

The invention claimed is:

1. A vane for use in a turbine comprising:
    (a) a flexible exchange of momentum surface adapted to receive mechanical kinetic energy by exchange of momentum from an impinging, moving fluid; and
    (b) a resilient, buckleable stiffening means comprising a substantially longitudinal region of said flexible exchange of momentum surface extending out from the plane of said flexible exchange of momentum surface which stiffens said flexible exchange of momentum surface thereby making said flexible exchange of momentum surface substantially rigid until said impinging, moving fluid exerts a force against said flexible exchange of momentum surface which exceeds a predetermined magnitude causing said resilient, buckleable stiffening means to buckle and remain buckled allowing said flexible exchange of momentum surface to become flexible until said impinging, moving fluid exerts a predetermined lesser force against said flexible exchange of momentum surface allowing said resilient, bucklable stiffening means to unbuckle and said flexible exchange of momentum surface to return to its original shape and rigidity.

2. A method of changing the shape of a vane for use in an exchange of momentum turbine or pump comprising:
   (a) providing a flexible exchange of momentum surface adapted to transfer mechanical kinetic energy by exchange of momentum to or from a fluid; and
   (b) providing said flexible exchange of momentum surface with a resilient, buckleable stiffening means comprising a substantially longitudinal region of said flexible exchange of momentum surface extending out from the plane of said flexible exchange of momentum surface which stiffens said flexible exchange of momentum surface thereby making said flexible exchange of momentum surface substantially rigid until said fluid exerts a force against said flexible exchange of momentum surface which exceeds a predetermined magnitude causing said resilient, buckleable stiffening means to buckle and remain buckled until said fluid exerts a predetermined lesser force against said flexible exchange of momentum surface which allows said resilient, buckleable stiffening means to unbuckle allowing said flexible exchange of momentum surface to return to its original shape and rigidity.

* * * * *